T. J. GOLDEN.
SIGNAL DEVICE FOR AUTOMOBILES.
APPLICATION FILED MAY 16, 1921.
1,412,206.
Patented Apr. 11, 1922.
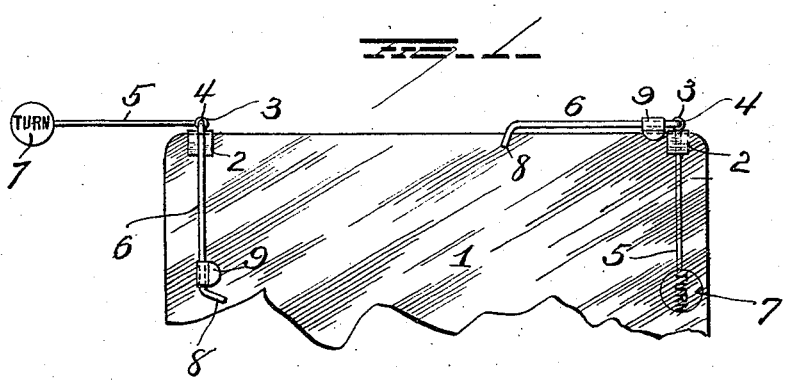
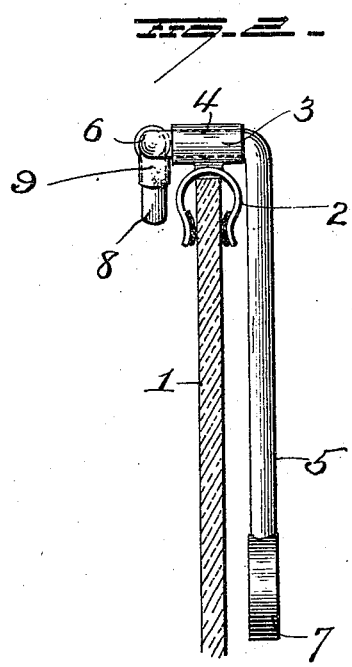
Inventor
T. J. Golden
By Seymour & Bright
Attorneys

UNITED STATES PATENT OFFICE.

TIMOTHY J. GOLDEN, OF JACKSONVILLE, FLORIDA.

SIGNAL DEVICE FOR AUTOMOBILES.

1,412,206.      Specification of Letters Patent.      Patented Apr. 11, 1922.

Application filed May 16, 1921. Serial No. 469,782.

*To all whom it may concern:*

Be it known that I, TIMOTHY J. GOLDEN, a citizen of the United States, and a resident of Jacksonville, in the county of Duval and State of Florida, have invented certain new and useful Improvements in Signal Devices for Automobiles; and I do hereby declare the following to be a full, clear, and exact description of the invention, such as will enable others skilled in the art to which it appertains to make and use the same.

This invention relates to improvements in signal devices for automobiles and more particularly to such signals as are adapted for use to indicate the direction in which the driver intends to make a turn or to slow down or stop—one object of the invention being to provide a simple and efficient device for the purpose stated, which may be applied to the wind shield of an automobile and readily operable by the driver, and to so construct the device that it will be held in the position to which it may be moved.

With this and other objects in view, the invention consists in certain novel features of construction and combinations of parts as hereinafter set forth and pointed out in the claims.

In the accompanying drawings, Figure 1 is a view showing the application of my improvements, and Figure 2 is an end view with the wind shield glass in section.

In Figure 1 of the drawings I have shown signal devices embodying my improvements mounted at respective sides or rather near respective ends of a wind shield, the latter being illustrated at 1. The two signal devices are the same in construction and hence a description of the details of one will suffice for the other.

My improvements comprise a spring clamp 2 which may be readily applied to the upper portion of the wind shield and will preferably have its jaws lined with rubber or other suitable material, and a tubular bearing sleeve 3 made rigid with said clamp to serve as a bearing for a crank-arm 4 which connects two arms 5 and 6, said bearing sleeve being disposed in a position at right angles to the wind shield.

The arm 5 normally occupies a position in front of the wind shield 1 and at its free end, carries a signal disk 7 which may be made of aluminium or other bright metal and may have thereon (on both sides) a word such as the word "Turn" of a color contrasting with that of the disk 7,—the letters of said word being made red for example. The arm 6 is disposed near the rear face of the wind shield and serves as an operating lever,—said arm 6 being preferably provided at its free end with a suitable handle 8. A small weight 9 is mounted on the arm or lever 6 so as to be freely movable thereon. Normally the signal arm 5 occupies a vertical position while the operating arm or lever 6 is normally disposed in a horizontal position near the upper edge of the wind shield and the weight 9 will be disposed close to the pivotal mounting of the arm.

When the rider desires to display one or the other signal, he will depress the arm or lever 6, thus causing the signal arm 5 to be raised to a horizontal position and thus display the signal disk carried by this arm. When the device is thus operated, the weight 9 will move on the arm or lever 6 to the free end portion of the latter and will serve to hold said arm depressed and the signal arm in display position.

Having fully described my invention what I claim as new and desire to secure by Letters-Patent is:—

1. In a signal device of the character described, the combination of a clamp adapted to engage the upper edge portion of a wind shield glass, a bearing sleeve carried by said clamp and disposed at right angles thereto whereby it will be disposed at right angles to the face of the wind shield, a signal arm carrying a signal disk, an operating arm, and a crank connecting said arms and mounted in said bearing sleeve.

2. In a signal device of the character described, the combination of a clamp adapted to engage the upper portion of a wind shield glass, a bearing sleeve carried by said clamp, a signal arm carrying a signal disk, an operating arm, a crank connecting said arms and mounted in said bearing sleeve, and a weight movably mounted on the operating arm.

In testimony whereof, I have signed this specification in the presence of two subscribing witnesses.

TIMOTHY J. GOLDEN.

Witnesses:
HENRY ROSENZVOIG,
SYDNEY J. SMITH.